United States Patent Office 3,389,642
Patented June 25, 1968

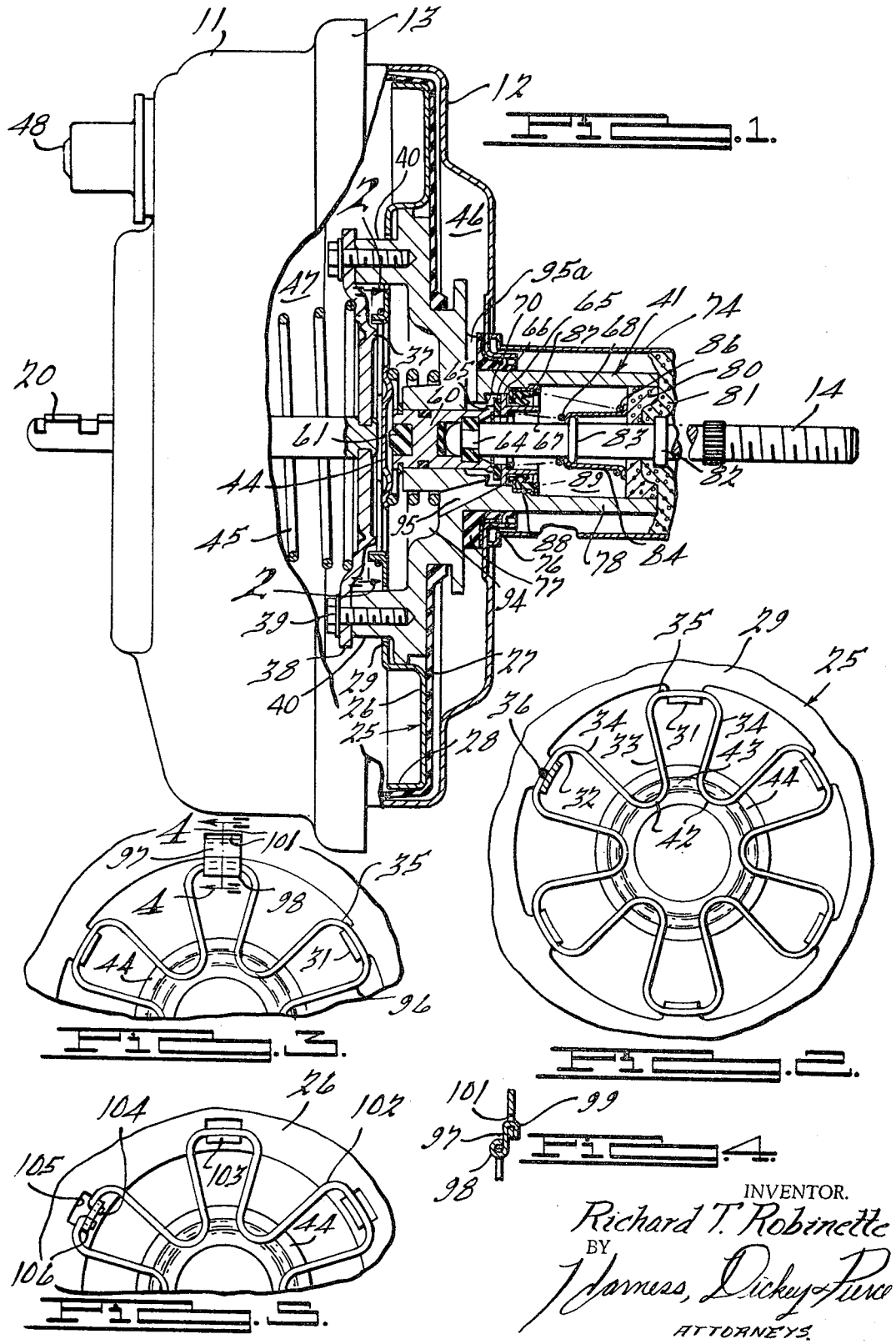

3,389,642
POWER BOOSTER FOR BRAKES
Richard T. Robinette, St. Clair Shores, Mich., assignor to Kelsey-Hayes Company, Romulus, Mich., a corporation of Delaware
Filed June 22, 1966, Ser. No. 559,587
5 Claims. (Cl. 91—369)

ABSTRACT OF THE DISCLOSURE

This invention relates to motor mechanism for operating vehicle hydraulic brakes and, particularly to a mechanism providing a reactive force to the foot operated brake pedal which is proportionate to the amount of braking power being applied to the vehicle.

---

The device has the usual motor with two chambers in which the pressures are balanced and which advances an element to move a master cylinder plunger from which fluid is dispensed through the conventional brake lines to the front and rear wheel cylinders. The plunger is carried by a plate which is secured to the element in the one chamber which is advanced to advance the plunger. The plate has an annular rib engaged by wire fingers intermediate their ends. The wire is formed into the outline of an eight petal clover leaf providing eight fingers falling on diameters across the center. The outer loops of each finger are engaged by angular fingers located in the center of a pressure responsive plate. The inner loops of the fingers rest against an annular rib on a washer element, the center of which is aligned with the center of the plunger. The resistance to the movement of the plunger reacts through the annular rib on the plate to deflect the fingers toward the brake pedal and provide a force on the annular rib of the central disc which is applied back through the valve structure and push rod to the foot pedal thereby indicating to the vehicle operator the amount of force which is being applied to the brakes. While similar arrangements and structure has heretofore been employed such as that of Patent 3,183,789 and assigned to the assignee of the present invention, the present invention substantially simplifies and reduces the cost of the reactive mechanism.

Accordingly, the main objects of the invention are: to provide a simplified mechanism for producing a reactive force on the foot operated brake pedal as the motor means actuated thereby applies fluid to the brake cylinders; to provide an annular rib on a plate of a movable element which functions as a fulcrum to apply a reactive force through wire fingers to a disc and the foot operated brake pedal, and in general, to provide a simplified mechanism for operating a master cylinder which produces a reactive force to the foot operated brake pedal in proportion to the braking force on the vehicle.

Other objects and features of novelty of the invention will be specifically pointed out or will become apparent when referring, for a better understanding of the invention, to the following description taken in conjunction with the accompanying drawing, wherein:

FIGURE 1 is a broken view in elevation of a fluid pressure motor having improved reactive mechanism for the brake pedal embodying features of the present invention.

FIG. 2 is an enlarged sectional view of the structure illustrated in FIG. 1, taken on the line 2—2 thereof;

FIG. 3 is a broken view of structure, similar to that illustrated in FIG. 2, showing another form which the invention may assume;

FIG. 4 is a broken sectional view of the structure illustrated in FIG. 3, taken on the line 4—4 thereof, and FIG. 5 is a view of structure, similar to that illustrated in FIG. 3, showing a still further form which the invention may assume.

As from the above noted patent the numeral 10 designates a fluid pressure motor as a whole, comprising casing sections 11 and 12 connected at their peripheries as at 13. A valve mechanism to be described, controls the energization of the motor and is operated by a push rod 14. The energization of the motor operates a master cylinder plunger 20 to displace fluid through convention brake lines to the front and rear wheel cylinders (not shown).

The motor is provided with a pressure responsive unit indicated as a whole by the numeral 25, and this unit embodies a diaphragm plate 26 and a diaphragm 27, the outer portion of which is adapted to roll on a flange 28 of the plate when clamped between the casing sections 11 and 12. The central portion 29 of the plate has an opening provided with angle-shaped fingers 31, herein illustrated as six in number. A wire is formed to have inwardly presenting loops 32 and outwardly presenting loops 33 which form radially disposed fingers 34, the outer web section 35 of which rest within the angle sections of the fingers 31. The ends of the wire are secured together by a weld 36.

It will be noted in FIG. 1 that the fingers 34 contact an annular rib 37 on a plate 38 which is secured by screws 39 to post 40 on a rigid unit 41 which extends through apertures in the central portions 29 of the plate 26. The inner ends 42 of the outwardly presenting loops 33 are engaged by an annular rib 43 on a disc 44. Any pressure exerted between the pressure responsive unit 25 and the plate 38 is passed through the fingers 34 to the disc 44. The plate 38 and rigid unit 41 are secured together by screws 39 and the unit thus formed is biased to its normal or "Off" position shown in FIG. 1 by a return spring 45. The rocking of the fingers takes place upon the admission of higher pressure to the variable pressure chamber 46 of the motor. In the present case, the motor is vacuum suspended and atmospheric pressure is admitted to the chamber 46. The constant pressure chamber 47 of the motor is connected through a fitting 48 including a check valve (not shown) to a source of available vacuum.

A control piston 60 is slidable in the rigid unit 41 and is provided with a rubber block 61, which is disposed in position to engage the center of the disc 44. The control piston 60 is connected as at 64 with the push rod 14 to be moved to the left thereby when the foot pedal is operated to apply a braking force. The piston 60 has a valve rim 65 normally engaged by a resilient valve seat 66 carried by a body 67 and biased toward the valve rim 65 by a spring 68. The valve rim 65 normally engages the seat 66 and maintains the seat disengaged from a valve rim 70 carried by the rigid unit 41. A cylindrical section 74 abuts the casing 12 having a flange 76 extending within the section. Within the flange 76 against the inner face of adjacent end wall of the casing section 12, is arranged a sealing member and bumper 77. A sleeve portion 78 of the rigid unit 46 carries the seal 77 which acts as a bumper to limit the return movement of the rigid element 41 to the "Off" position shown.

Two air filters 80 and 81 surround the push rod 14, the filter 80 being slidable in the sleeve portion 78 and the filter 81 being slidable within the cylindrical element 74. The latter filter is retained against an annular flange 82 on the push rod 14. The rod carries a second annular flange 83 which is engaged by the inner end of a spring seat 84. The spring 68 has its outer end in engagement with the seat 84 and its inner end disposed against the member 67 to cause the valve seat 66 to move to the left. The enlarged end of the spring seat 84 is engaged by one end of a spring 86, the other end of which engages a seat 87 to bias the seat 84 and consequently the rod 14 to its normal "Off" position. Since the valve piston 60 is open to vacuum at its left hand and to atmospheric pressure at its right hand, the unbalance in pressure is compensated for by making the spring 86 sufficiently heavy to return the control pistons 60 and rod 14 to the normal positions. The springs 68 and 86 are located in an atmospheric chamber 89 to which air is supplied through the air filters 80 and 81 until it is cut off from the motor by the valve 65 when parts are in the normal position shown. As previously stated, the motor chamber 47 is connected to a vacuum source 42 and to a chamber 94 formed in the rigid body 41. The seal 88 acts to seal the chambers 89 and 94 from each other cutting off an aperture 95 from a passageway 95a when in closed position. The chamber 47 is connected by passages 95 and 96 to the motor chamber 46 and when the valve rim 70 is open. The seating of the seat 66 on the valve rim 70 separates the two chambers 46 and 47 from each other.

Operation

With the valve elements 65, 66 and 70 in the normal positions illustrated in FIG. 1, the variable pressure motor chamber 46 will be in communication with the constant vacuum chamber 47 in a manner previously described. Air flowing through the air filters 80 and 81 into the chamber 89 will be cut off at the valve rim 65. The motor accordingly will be vacuum suspended and the pressure responsive unit will be held in its "Off" position against the combined seal and bumper 77 by the spring 45. The spring 68 maintains the seat 66 in engagement with the valve rim 65 and the latter valve rim is held in its normal position by the spring 86. The valve rim 70 will be in its normal open position.

When the brakes are to be applied, the foot pedal is depressed to move the push rod 14 to the left, as viewed in FIG. 1, correspondingly moving the valve rim 65. If the valve rim moves to the left it will be followed by the valve seat 66 until the latter engages the valve rim 70 at which point the valve elements will be in closed condition. The vacuum chamber 47 will now be cut off from the motor chamber 46. Slightly further movement of the push rod 14 and the valve seat 66 arrested by the valve rim 70, will separate from the valve rim 65 to permit air from the chamber 89 to flow through passage 95 to the chamber 46 thus subjecting the pressure responsive unit 25 to differential pressures to move it to the left to operate the master cylinder plunger 20 and initiate the operation of the brake cylinders. Since little force is required to move the brake shoes up to the drum, initial motor operation takes place quite easily with little differential pressures on opposite sides of the pressure responsive unit 25.

As soon as the brake shoes engage the drums, movement of the master cylinder plunger 20 and the pressure responsive unit 25 will be retarded and a more rapid increase in pressure in the chamber 46 will occur. When this pressure reaches a predetermined point the plate section 29 will deflect to the left forcing the webs 35 of the fingers 34 to the left therewith. The engagement of the fingers 34 with the annular rib 37 tends to move the ends 42 of the loops 33 to the right against the disc 44. This increases the pressure on the plunger 60 and rod 14 thereby providing a reactive force to the applied foot pressure proportionate to the differential in pressure in the chambers 46 and 47, which is proportionate to the braking action on the wheels of the vehicle. As the braking actions become greater the reactive force on the foot of the operator increases. This force can be regulated by changing the position of the ribs 37 and 43 so as to change the moment arm each side of the rib 37 from the two-to-one relationship shown. Similarly, the diameter of the wire may be increased or decreased to avoid any substantial flexing thereof.

In FIG. 3 a similar type of looped element 96 has the web ends 35 similarly supported in angular fingers 31 except for one position wherein a clip 97 has a sleeve 98 on one end and a reversely bent flange 99 on the other. The flange extends into a slot 101 in the web 29 for supporting the sleeve 98 in position to retain the two ends of the element 96 together in abutted relationship. In place of the clip 97 the finger 31 may be extended and a sleeve 98 rolled thereon.

A still further end holding structure is illustrated in FIG. 5 wherein the spring element 102 has a plurality of fingers 34 formed by the loops 32 and 33. With this arrangement fingers 103 are lanced from the metal of the element 26 to extend at right angles thereto as illustrated in the figure. The fingers 34 extend behind these flanges and the two ends 104 of the wire are reversely bent inwardly of the loop to extend through apertures 105 in the lanced element 106. The reactive force provided by any of the three assemblies illustrated in FIGS. 2, 3 and 5 produces pressure on the foot of the operator during the application of fluid pressure to the brake cylinders.

Obviously, the present motor provides a follow-up action between the valve plunger 60 with its rod 14 and the pressure responsive unit 25. If, after the motor is energized to its maximum extent, additional braking force is desired, the further push on the pedal will overcome the flexing of the fingers 34 and a direct pressure will be applied through the valve plunger 60 to the rigid member 38 to assist the motor in applying a greater force to the master cylinder plunger.

What is claimed is:

1. In a brake operating mechanism, a plunger for actuating a master cylinder, motor means for advancing said plunger under control of a foot actuated rod, a pressure responsive unit in the motor means, wire formed into coplanar loop shaped fingers having the outer portion carried by said pressure responsive unit, a fixed abutment means engaged by the middle portion of said fingers, means connecting the inner portion of said fingers to the foot actuated rod to apply a force thereto in a direction opposite to that in which the braking force is applied.

2. In a device as recited in claim 1, wherein the pressure responsive unit has a central opening containing spaced extending flanges on which the outer portion of the fingers are carried.

3. In a device as recited in claim 1, wherein one of said fingers containing the two wire ends is secured in a sleeve provided on one of said flanges.

4. In a device as recited in claim 1, wherein one of said fingers has the outer portion formed from the two wire ends, and one of said flanges has a pair of apertures for receiving said ends.

5. In a device as recited in claim 1, wherein the ends of the wire are secured together to simulate a multi petaled clover leaf.

References Cited

UNITED STATES PATENTS

| | | |
|---|---|---|
| 2,798,718 | 7/1957 | Gross. |
| 2,972,983 | 2/1961 | Ayers. |
| 2,990,815 | 7/1961 | Ayers. |
| 3,009,445 | 11/1961 | Wuellner. |

PAUL E. MASLOUSKY, *Primary Examiner.*